United States Patent [19]

Gajewski

[11] Patent Number: 4,501,759
[45] Date of Patent: Feb. 26, 1985

[54] CEREAL PRESWEETENED WITH ASPARTAME AND COLD WATER SOLUBLE GUM COATING AND METHOD OF PREPARATION

[75] Inventor: Robert J. Gajewski, Crystal, Minn.

[73] Assignee: General Mills, Inc., Minneapolis, Minn.

[21] Appl. No.: 380,655

[22] Filed: May 21, 1982

[51] Int. Cl.$^3$ .............................................. A23L 1/164
[52] U.S. Cl. ...................................... 426/96; 426/302; 426/548
[58] Field of Search ................. 426/96, 302, 548, 620, 426/804, 575, 577, 289

[56] References Cited

U.S. PATENT DOCUMENTS

| | | | |
|---|---|---|---|
| 3,800,046 | 3/1974 | Schlatter | 426/548 |
| 3,943,258 | 3/1976 | Bahoshy et al. | 426/3 |
| 3,947,600 | 3/1976 | Rousseau | 426/302 |
| 3,955,000 | 5/1976 | Baggerly | 426/96 |
| 4,079,151 | 3/1978 | Schade et al. | 426/96 |
| 4,139,639 | 2/1979 | Bahoshy et al. | 426/3 |
| 4,378,377 | 3/1983 | Gajewski | 426/96 |

FOREIGN PATENT DOCUMENTS

EP27024 4/1981 European Pat. Off. .

OTHER PUBLICATIONS

Cloninger et al, Journal of Food Science, vol. 39, (1974), pp. 347–349.

*Primary Examiner*—Raymond Jones
*Assistant Examiner*—Elizabeth A. King
*Attorney, Agent, or Firm*—Gene O. Enockson; John A. O'Toole

[57] ABSTRACT

Disclosed are comestibles, particularly ready-to-eat cereals, having an exterior coating sweetened with aspartame as well as methods of preparing such coated comestibles. The methods of preparation comprise: (a) preparing an aqueous suspension comprising sufficient amounts of certain cold water-soluble gums to provide a viscosity of 50 to 25,000 cp. (65° F.) and from about 0.1% to 4% aspartame; (b) enrobing a comestible with the aqueous suspension at a temperature of from about 50° F. to 100° F. to apply sufficient amounts of aspartame so as to provide between about 0.05% to 0.3% aspartame; and then (c) drying the comestibles to a final moisture content of less than about 5%.

9 Claims, No Drawings

CEREAL PRESWEETENED WITH ASPARTAME AND COLD WATER SOLUBLE GUM COATING AND METHOD OF PREPARATION

BACKGROUND OF THE INVENTION

1. Field of the Invention

The present invention relates to food products and to methods of their preparation. More particularly, the present invention relates to cereal products presweetened with a coating containing aspartame.

2. The Prior Art

Cereal products, particularly ready-to-eat (hereinafter "R-T-E") breakfast cereals, are well known and popular food items, particularly presweetened R-T-E cereals. Typically, such products include various coatings usually comprising nutritive carbohydrate sweeteners such as sucrose, corn syrup, fructose, etc. While presweetened cereals are popular, concern exists about the affect of such sugars upon diet and dental health.

Attempts have been made to substitute high potency sweeteners such as aspartame for sugar to provide presweetened cereals to reduce sugar consumption. However, aspartame is thermally unstable, causing decomposition and concommitant loss of sweetness. Since aspartame is thermally unstable, the sweetener has been applied to the surface as a coating to the cereal base rather than being added to the other cereal ingredients such as flour, starches, nuts, etc. from which the base is prepared by cooking, explosion, puffing, etc.

Aspartame (L-aspartyl-L-phenylalanine methyl ester) is relatively water insoluble (apx. 1% in water at 20° C.). Thus, application of such sweeteners to a cereal base as a coating presents certain difficulties such as unevenness of application. Such unevenness can result in a phenomenon called "hotspotting" characterized by an intense taste sensation when consumed.

Art attempts to provide cereals coated with aspartame include U.S. Pat. No. 3,955,000 (issued May 4, 1976 to P. A. Baggerly). There, the aspartame was admixed in aqueous suspension with relatively high concentrations of water soluble dextrins. Atomization is used to evenly apply the suspension to the cereal base. A similar technique is disclosed in U.S. Pat. No. 4,079,151 (issued Mar. 14, 1978). There, however, malto dextrin was substituted for the hydrolyzed dextrins in the aqueous dispersion so as to provide a coating which upon driving provides a frosted appearance as opposed to the glassy appearance taught as resulting from the methods of the '000 patent. The '151 patent also teaches the necessity of spraying the suspension with successive applications in order to produce a frosted appearance.

Other products such as chewing gums have also been provided with coatings containing aspartame as the sweetening agent (see, for example, European Pat. No. 27,024 issued 15/4/81 to Michael Glass and Theresa Cea). There, the aspartame as well as other coating ingredients are dusted onto the article surface and then mechanically affixed to the relatively soft gum exterior by rolling, sizing or wrapping, etc.

The present invention, however, is an improvement over the non-mechanical methods and products of the '000 and '151 patents in at least three respects. First, it has been found that another class of materials previously unrecognized as being suitable for use in aspartame coatings has been surprisingly found to be useful. These materials newly discovered as being useful include certain cold water soluble gums. Second, and more importantly, the present invention can be practiced with cold water or ambient temperature aqueous suspensions being used as a carrier for the aspartame coating. Employment of cold aqueous suspension minimizes or at least reduces the thermal degradation of aspartame caused by the processes of the '000 and '151 patents and thus allows for reduced aspartame usage. Third, the present invention eliminates multiple coating steps previously recognized as being necessary and accomplishes a satisfactory coating in a single application step.

SUMMARY OF THE INVENTION

The present invention relates to comestibles, particularly R-T-E cereals, having a coating comprising aspartame and certain water soluble gums. The aspartame is present at from about 0.05% to 0.3% by weight of the food product. The gum member is essentially present at from about 0.05% to 1.5% of the final product. The total coating is present at from about 0.1% to about 1.8% of the coated product.

The gum member is selected from the group consisting of sodium alginates, propylene glycol alginates, guar gum, kappa carrageenan, gum Arabic, locust bean, pectin, methylcellulose, hydroxypropyl methylcellulose and mixtures thereof.

In its method aspect, the present invention relates to methods for the preparation of comestibles having a sweetened coating wherein the sweetener is aspartame. The present method includes as essential steps: (a) providing an aqueous suspension or carrier for the aspartame; (b) enrobing the comestible with sufficient amounts of the suspension to provide requisite aspartame levels; and (c) drying the enrobed comestible to a final moisture content of less than about 5.0%.

The aqueous suspension essentially comprises from about 0.1% and 4.0% aspartame and generally from about 0.1% to 5% of the selected cold water soluble gum member.

The enrobing step is generally practiced at a temperature of from about 50° F. to 100° F. for both the comestible base and the suspension. Sufficient amounts of aqueous suspension are used to enrobe the comestible so as to apply from about 0.05% to 0.3% aspartame based on the comestible (dry weight).

DETAILED DESCRIPTION OF THE INVENTION

The present invention relates to comestibles, particularly R-T-E cereals, having a coating sweetened with aspartame. In its method aspect, the present invention relates to processes for the preparation of such coated comestibles comprising the steps in sequence of: (a) providing an aqueous suspension of aspartame; (b) enrobing the comestible with the aqueous suspension; and (c) drying the comestible. Each of these product preparation steps as well as product use are described in greater detail below.

Throughout the specification and claims, percentages and ratios are by weight, and temperatures in degrees Fahrenheit, unless otherwise indicated.

A. Providing an Aqueous Suspension of Aspartame

An essential step of the present method is to provide an aqueous suspension of aspartame. The term "aspartame" is used in its conventional sense as a generic term referring to high intensity dipeptide sweeteners which are derivatives of two amino acids, L-aspartic acid and the methyl ester of phenylalanine. These compounds are generally well known in the art and are disclosed in detail in, for example, the '151 and the '000 patents referenced above and incorporated herein by reference. Aspartame is commercially available as an odorless, white, crystalline powder having a sweetness generally characterized as apx. 200 times that of sucrose.

The suspension of aspartame generally includes from about 0.1% to about 4% aspartame, preferably from about 0.5% to 2.5%. Of course, since aspartame is only slightly soluble in cold water, a fraction of the aspartame will be in solution; however, the larger fraction will be suspended and dispersed. The particle size of the aspartame is not critical. It is preferred, however, that the particle size be fine since smaller particle sizes are useful in realizing more stable aqueous suspensions. Also, a reduced particle size favorably affects the evenness of the aspartame distribution on the coating composition. Aspartame of conventional and commercially available fineness are quite suitable for use herein such as Nutra Sweet ® brand available from Searle Food Resources Inc., subsidiary of G. V. Searle & Co.

The cold water soluble gum suspending agents useful herein must perform all of several functions. First, the agents must be capable of maintaining the aspartame in suspension. Also, the suspending agent serves an adhesive function binding the aspartame to the surface of the comestible. Additionally, the suspending agent aids in the even distribution of the suspension over the comestible base during enrobing. It has been surprisingly discovered that instead of materials such as the dextrinaceous materials previously suggested for use in the '000 and the malto dextrinaceous of the '151 patents, that certain cold water soluble gum materials can also be usefully employed. The suspending agent useful in the present invention essentially comprises a cold water soluble gum member selected from the group consisting of sodium alginates, propylene glycol alginates, guar gum, gum Arabic, locust bean gum, pectin, kappa carrageenan, methylcellulose, hydroxypropyl methylcellulose and mixtures thereof. Preferred gum members are selected from the group consisting of sodium alginates, pectin, guar gum, and mixtures thereof.

The physical and chemical properties of edible gums and their use are well known in the food art and selection of specific gum and gum suppliers for use herein will pose no problem for the skilled artisan. (See, for example, "Gum Technology in the Food Industry," Glicksman, Academic Press, N.Y., 1969; "Food Colloids," ed. by H. D. Graham, Avi Publishing Co., Westport Conn. 1977; "Industrial Gums," R. L. Whistler, 2nd ed., Academic Press, N.Y., 1973; "Hydrocolloids (Natural Plant)," Encyclopedia of Food Science, ed. by M. S. Peterson and A. H. Johnson, The Avi Publishing Co., Westport, Conn., 1978.

Water soluble pectin is a mixture of water soluble pectinic acids of varying methoxyl content and degree of neutralization. Water soluble pectin, of course, is well known in the food art (see, for example, 21 C.F.R. 182.1775). The commercial preparation of pectin involves the extraction of plant materials rich in pectic substances with hot acidulated water or complexing agents, filtering of the extracts, and precipitation of the pectin with ethanol, isopropanol or polyvalent salts. The clarified extract is also spray or roller dried or concentrated to give liquid pectin.

Sodium alginate is the refined hydrocolloid prepared by extraction from red seaweed. The sodium salt and propylene glycol ester are readily soluble in hot or cold water. The propylene glycol ester of alginic acid has special suitability in low pH systems.

The methylcellulose is a nonionic cellulose based gum. Methylcellulose is prepared by treating cellulose fibers, usually cotton linters or wood pulp, with caustic-soda solutions to yield an alkali cellulose. This is then treated with methyl chloride to yield the methyl ether of cellulose or "methylcellulose." A further reaction with propylene oxide gives a hydroxypropyl substitution yielding mixed ethers of cellulose. In the U.S., Dow Chemical is the primary producer of these materials sold under the trade name Methocel.

Gum Arabic or gum acacia has been widely used since antiquity. The gum originates from exudation resulting from a bacterial or fungal infection from wounded trees in the middle east.

Guar gum is the finely ground endosperm of the seed of the guar plant. Structurally, guar gum is a galactomannan of molecular weight of about 220,000–250,000. It has a straight chain of D-mannose with a galactose side chain at about every other mannose unit.

Locust bean gum is closely related to guar gum and is the finely ground endosperm of the carob tree.

Carrageenan is an anionic, sulfated polysaccharide obtained from red algae. Structurally, carrageenan has been characterized as having three fractions termed kappa, lambda, and iota carrageenan respectively. The ideal kappa fraction would have 1,3-linked galactose-4-sulfate units with 1,4-linked 3,6 anhydro-D-galactose units. The kappa fraction can be separated and is commercially available in a variety of purities.

The suspending agent(s) is desirably present at levels sufficient to suspend the aspartame in the present method of coated cereal preparation. Sufficient levels of suspending agents are generally characterized by gum levels providing viscosities (at 65° F.) ranging from about 50 to 25,000 cp., preferably from about 500 to 5,000 cp. Such viscosities are obtained generally when the suspending agent is present at from about 0.2% to 4.0% of the suspension or dispersion. Better results in terms of dispersion stability are obtained in a concentration ranging from about 0.5% to 2.5%.

Still another advantage of the present invention is that selection of the present materials, unlike prior art materials, allows for using ambient temperature or "cold water" aqueous suspensions to realize coated comestibles. While colder water can be employed, potable water in typical plant operations generally rarely is cooler than about 50° F. Since aspartame thermal degradation is both time and temperature dependent, employment of cold water suspensions minimizes undesirable thermal degradation of the expensive aspartame ingredient and thus the concomitant loss in sweetness. Thus, lower amounts of aspartame can be used in the coatings to obtain desired levels of sweetness. Desirably then, the aqueous suspension is maintained at a temperature no greater than about 100° F.

Of course, while it is intended that aspartame will be the primary sweetener in the coatings of the present invention, any other conventional sweeteners, e.g., sucrose, fructose, corn syrups, honey, etc. can be used in the coating to supplement the sweetness of the aspartame or to impart other properties to the coating, e.g., frangibility, frostiness, etc.

If allowed to stand for lengthy periods, some settling of the undissolved aspartame may occur. Simple mixing or agitating can be used to evenly re-distribute the aspartame throughout the aqueous suspension prior to the enrobing step.

B. Enrobing

Another essential step of the present product preparation process is to enrobe the comestible with the aqueous suspension of aspartame.

The weight ratio of aqueous suspension to comestible base can vary widely depending most strongly on the final concentration or sweetness of aspartame desired in the coating and the concentration of aspartame in the aqueous suspension. Generally, however, good results are obtained when the weight ratio of aqueous suspension to comestible base ranges from about 1:25 to about 1:10. Preferably, the weight ratio ranges from about 1:20 to 1:15.

Any desired comestible base desired to be coated can be used herein, e.g., gum pieces, confections, doughnuts, etc. The present invention has particular usefulness in the provision of presweetened R-T-E cereals. The cereal particles which may be coated in accordance with this invention include all R-T-E cereal particles in flaked, shredded, expanded, or other forms, such as corn flakes, shredded wheat, puffed wheat, puffed rice, expanded oats, puffed corn, bran flakes, whole bran cereal, breakfast cereals in the form of extruded and puffed doughs, and the like. Such cereal particles are prepared in the usual manner and may be either toasted or untoasted.

Any conventional enrobing apparatus and technique can be used to practice the present enrobing or application step. Generally, a useful technique involves tumbling. The comestible piece(s) and aqueous suspension are each charged in any order to a rotating drum and tumbled for a sufficient time to achieve an even distribution of the suspension on the comestible. Preferably, the aqueous suspension is added after the comestible has been added to the drum. Another useful technique is simply spraying the aqueous solution over those comestibles which are desirably not tumbled due to the shape, frangibility, etc.

Since aspartame is thermally unstable, it is desirable to maintain the aqueous suspension at low temperatures, e.g., room temperature or below. However, the temperature of the suspension can range during the enrobing step from about 50° F. to 100° F. and preferably between about 60° F. to 80° F. When R-T-E cereal pieces are being coated, the cereal pieces typically will be warm, ranging in temperature, for example, from about 120° F. to 180° F. Since it is desirable to keep the aspartame cool, in such instances, ambient temperature or cooler aqueous suspensions are preferred for use.

C. Drying

An essential step in the present method is to dry or dehydrate the enrobed comestible pieces to a moisture content of less than about 5%, and preferably less than about 3% to form the coated comestibles of the present invention sweetened with aspartame. Any conventional method of drying and equipment can be used to reduce the moisture content of the enrobed comestible pieces. The drying can be accomplished using such equipment as rotary bed, tray and belt dryers. The preferred dehydration technique is forced hot air convection drying. Of course, since aspartame is thermally unstable, preferred drying techniques are those which are practiced at reduced temperatures, e.g., below about 150° F.

The finished dipeptide sweetened product yields a sweetness profile similar to sucrose sweetened comestibles and desirably comprises from about 0.05% to 0.3% aspartame, preferably from about 0.1% to 0.2%, and from about 0.05% to 1.5% of the gum member, preferably from about 0.07% to 0.5%.

The following examples are given to further illustrate the present invention but not to limit the invention disclosed herein.

EXAMPLE I

The following slurry was made up using a Waring Blender to mix and disperse the components.

| Amount | Ingredient | Weight % |
|---|---|---|
| 8.4 g. | Aspartame | 1.38 |
| 12.0 | Pectin* | 1.97 |
| 588.0 | Cold tap water | 96.65 |
| 608.4 g. | | 100.00% |

*BA-KING brand pectin, produced by the Copenhagen Pectin Factory, Ltd., a wholly owned subsidiary of Hercules, Inc. (Wilmington, DE, U.S.A.)

The viscosity is determined to be about 460 cp. (65° F.).

Thirty one grams of the room temperature suspension, i.e., apx. 65° F., was sprayed on 600 grams of a dried cereal base (Wheaties brand toasted wheat cereal flakes) in a batch enrober using a Sears brand hand held paint spray gun. This product was dried in a forced air dryer for 4 minutes at 150° F. Its finished composition on a dry weight basis is as follows:

| Cereal Base | 99.80% (DWB) |
|---|---|
| Pectin | 0.11 |
| Aspartame | 0.21 |
| | 100.00% |

The coating thus comprises about 0.2% of the food product.

The presweetened cereal so prepared exhibits a pleasant sweet flavor without any bitterness.

EXAMPLE II

A presweetened R-T-E cereal of the present invention was prepared by first forming a slurry having the following composition:

| Amount | Ingredient | Weight % |
|---|---|---|
| 594.0 g. | Cold tap water | 96.77 |
| 6.0 | Refined Sodium Alginate* | 0.98 |
| 13.8 | Aspartame | 2.25 |
| 613.8 g. | | 100.00% |

*Kelgin ®-HV brand sodium alginate produced by the Kelco Division of Merck & Co., Inc.

The same procedure was used to prepare and to apply 31 g. of the slurry as in Example I to 500 g. cereal base. The coated product was dried at 150° F. for 4 minutes in a forced air dryer, resulting in the following final composition on a dry weight basis.

| Cereal base | 99.80% (DWB) |
|---|---|
| Sodium Alginate | 0.06 |
| Aspartame | 0.14 |
| | 100.00% |

The presweetened cereal so prepared had a pleasing level of sweetness resulting from the coating. The final moisture content was about 2%.

EXAMPLE III

A solution of 495 grams of cold tap water and 5 grams of Viscarin ® brand carrageenan was blended in a Waring Blender. The viscosity of thus solution was 292 cp. (65° F.). Then 1.0 grams of aspartame was dispersed in 30 grams of the above solution and the mixture was sprayed on 500 grams of General Mills' Country Corn Flakes ® brand cereal with a paint sprayer. The resulting product was dried at 150° F. for 4 minutes in a forced air dryer. On a dry weight basis, the final R-T-E cereal product had the following composition and a sweetness equivalent to it comprising 35% sucrose:

| | |
|---|---|
| Country Corn Flakes | 99.74% (DWB) |
| Aspartame | 0.20 |
| Carrageenan* | 0.06 |
| | 100.00% |

*Viscarin ® brand carrageenan is a sodium "kappa" type carrageenan produced by Marine Colloids Division of FMC Corporation of Springfield, NJ.

What is claimed is:

1. A sweetened, dry comestible consisting essentially of: a dry comestible, said comestible having a coating, said coating comprising
   from about 0.05% to 1.5% by weight of the comestible of a water soluble member selected from the group consisting of sodium alginates, propylene glycol alginates, guar gum, locust bean gum, gum Arabic, pectin, kappa carrageenan, methylcellulose, hydroxypropyl methylcellulose, and mixtures thereof, and
   about 0.05% to 0.3% by weight aspartyl-phenylalanine methyl ester, and
   wherein the coating is present at from about 0.1% to about 1.8% of the coated comestible.

2. The comestible of claim 1 wherein the comestible is a ready-to-eat cereal particle.

3. The comestible of claim 2 wherein the aspartame is present at from about 0.1% to 0.2% by weight of the comestible and wherein the water soluble gum member is present at from about 0.07% to 1.5% by weight of the comestible.

4. The comestible of claim 3 wherein the water soluble gum member is selected from the group consisting of sodium alginate, guar gum, pectin, and mixtures thereof.

5. A method for coating a dry comestible with aspartyl-phenylalanine methyl ester, comprising the steps of:
   A. forming an aqueous suspension, comprising
      (1) from about 0.1% to 4% by weight of the suspension of aspartyl-phenylalanine methyl ester, and
      (2) sufficient amounts of a cold water soluble gum to suspend the aspartyl-phenylalanine methyl ester,
   B. enrobing the comestible with the aqueous suspension at a temperature of less than 100° F. wherein the weight ratio of aqueous suspension to the comestible ranges from about 1:25 to about 1:10 to form an enrobed comestible, and
   C. drying the enrobed comestible to a moisture content of less than 5% by weight.

6. The method of claim 5 wherein the comestible base is a ready-to-eat cereal particle.

7. The method of claim 6 wherein the aqueous suspension comprises from about 0.2% to 4% of the cold water soluble gum member, said gum member being selected from the group consisting of sodium alginates, propylene glycol alginates, guar gum, gum Arabic, locust bean gum, pectin, kappa carrageenan, methylcellulose, hydroxypropyl methylcellulose, and mixtures thereof.

8. The method of claim 7 wherein the weight ratio of aqueous suspension to comestible ranges from about 1:20 to 1:15 and wherein the temperature of the aqueous suspension ranges from about 60° F. to 80° F.

9. The method of claim 8 wherein the aspartyl-phenylalanine methyl ester comprises from about 0.5% to 2.5% of the aqueous suspension and wherein the gum member is present in the aqueous suspension in amounts sufficient to provide a viscosity of from about 500 to 10,000 cp. at 65° F.

* * * * *